United States Patent
Kim et al.

(10) Patent No.: US 12,445,420 B2
(45) Date of Patent: Oct. 14, 2025

(54) MESSAGE ENCRYPTION METHOD AND ELECTRONIC DEVICE

(71) Applicant: Samsung Electronics Co., Ltd., Suwon-si (KR)

(72) Inventors: Dohoon Kim, Suwon-si (KR); Sewon Park, Suwon-si (KR); Jookyoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 18/149,460

(22) Filed: Jan. 3, 2023

(65) Prior Publication Data

US 2023/0155990 A1 May 18, 2023

Related U.S. Application Data

(63) Continuation of application No. PCT/KR2021/007793, filed on Jun. 22, 2021.

(30) Foreign Application Priority Data

Jul. 7, 2020 (KR) ........................ 10-2020-0083309
Dec. 1, 2020 (KR) ........................ 10-2020-0166056

(51) Int. Cl.
*H04L 9/40* (2022.01)
*H04L 5/00* (2006.01)

(52) U.S. Cl.
CPC .......... *H04L 63/065* (2013.01); *H04L 5/0055* (2013.01); *H04L 63/00* (2013.01); *H04L 63/0435* (2013.01)

(58) Field of Classification Search
None
See application file for complete search history.

(56) References Cited

U.S. PATENT DOCUMENTS 6,470,085 B1  10/2002  Uranaka et al.
8,958,559 B2  2/2015  Vedina et al.
(Continued)

FOREIGN PATENT DOCUMENTS

JP  2009-212850 A  9/2009
JP  2019-121999 A  7/2019
(Continued)

OTHER PUBLICATIONS

WhatsApp Encryption Overview, Technical white paper, Dec. 19, 2017 Originally published Apr. 5, 2016.
(Continued)

*Primary Examiner* — Trang T Doan
(74) *Attorney, Agent, or Firm* — Jefferson IP Law, LLP

(57) ABSTRACT

An electronic device is provided. The electronic device includes a communication module, a memory, and a server processor operably connected to the communication module and the memory. The server processor acquires, from the first electronic device, a first message encrypted based on first security information about the second electronic device, so as to transmit the first message to the second electronic device, acquires, from the second electronic device, a decryption failure signal for the first message so as to transmit the decryption failure signal to the first electronic device, acquires, from the second electronic device, second security information about the second electronic device so as to transmit same to the first electronic device, receives, from the first electronic device, a second message encrypted based on the second security information, and can transmit the received second message to the second electronic device.

20 Claims, 9 Drawing Sheets

(56) References Cited

U.S. PATENT DOCUMENTS

| | | | |
|---|---|---|---|
| 8,966,599 B1* | 2/2015 | Barrows | H04L 63/0846 705/37 |
| 9,509,679 B2 | 11/2016 | Abbott | |
| 10,129,187 B1 | 11/2018 | Leavy et al. | |
| 10,313,135 B2 | 6/2019 | Lord et al. | |
| 10,362,159 B1* | 7/2019 | Venkatachalam | H04L 67/125 |
| 10,826,900 B1* | 11/2020 | Poder | H04L 63/105 |
| 11,159,511 B1* | 10/2021 | Geusz | H04L 63/102 |
| 11,316,666 B2 | 4/2022 | Leavy et al. | |
| 11,411,744 B2 | 8/2022 | Watanabe | |
| 2010/0254533 A1* | 10/2010 | McCullough | H04W 12/043 713/150 |
| 2015/0012747 A1* | 1/2015 | Choi | H04L 63/0435 713/168 |
| 2016/0119307 A1* | 4/2016 | Zollinger | H04L 63/08 726/4 |
| 2017/0012950 A1 | 1/2017 | Kim et al. | |
| 2017/0072875 A1 | 3/2017 | Kim | |
| 2019/0173668 A1 | 6/2019 | Cui et al. | |
| 2020/0403844 A1* | 12/2020 | Greene | G06F 16/9574 |
| 2021/0058237 A1* | 2/2021 | Sandberg | G06F 21/72 |
| 2021/0067335 A1* | 3/2021 | Lee | H04L 9/0891 |
| 2021/0234845 A1* | 7/2021 | Smelov | H04L 51/046 |
| 2021/0279365 A1* | 9/2021 | Apsingekar | G06F 21/6254 |
| 2022/0014918 A1* | 1/2022 | Mastenbrook | G06F 21/64 |

FOREIGN PATENT DOCUMENTS

| | | |
|---|---|---|
| KR | 10-0291709 B1 | 6/2001 |
| KR | 10-2008-0030266 A | 4/2008 |
| KR | 10-1207694 B1 | 12/2012 |
| KR | 10-2013-0096575 A | 8/2013 |
| KR | 10-2013-0121348 A | 11/2013 |
| KR | 10-2014-0058196 A | 5/2014 |
| KR | 10-1675332 B1 | 11/2016 |
| KR | 10-1684919 B1 | 12/2016 |
| KR | 10-2017-006813 A | 1/2017 |
| KR | 10-2018-0000220 | 1/2018 |
| KR | 10-2019-0069230 A | 6/2019 |
| WO | 2019/110574 A1 | 6/2019 |

OTHER PUBLICATIONS

International Search Report dated Sep. 17, 2021, issued in International Application No. PCT/KR2021/007793.

Korean Office Action dated Apr. 30, 2025, issued in Korean Patent Application No. 10-2020-0166056.

\* cited by examiner

MESSAGE ENCRYPTION METHOD AND ELECTRONIC DEVICE

CROSS-REFERENCE TO RELATED APPLICATION(S)

This application is a continuation application, claiming priority under § 365(c), of an International application No. PCT/KR2021/007793, filed on Jun. 22, 2021, which is based on and claims the benefit of a Korean patent application number 10-2020-0083309, filed on Jul. 7, 2020, in the Korean Intellectual Property Office, and of a Korean patent application number 10-2020-0166056, filed on Dec. 1, 2020, in the Korean Intellectual Property Office, the disclosure of each of which is incorporated by reference herein in its entirety.

BACKGROUND

1. Field

The disclosure relates to a method and an apparatus for encrypting a message. More particularly, the disclosure relates to a transmission device and a reception device transmitting and receiving messages mutually providing security information (for example, public keys) to use end-to-end encryption.

2. Description of Related Art

With the development of wireless communication technology, electronic devices (for example, electronic devices for communication) are used for various purposes. The electronic device may transmit and receive text messages for the purpose of communication with another electronic device. For example, the electronic devices may mutually exchange messages according to a communication protocol and/or a communication agreement.

A transmission device which transmits a message and a reception device which receives the message may use end-to-end encryption in order to enhance security of message transmission. For example, the end-to-end encryption may encrypt the message during a step in which the transmission device inputs the message and transmit the encrypted message to the reception device. The reception device may decrypt the encrypted message received from the transmission device and identify the message. The transmission device and the reception device which transmit and receive the message may use the end-to-end encryption based on security information (for example, a public key) for addressing the encryption.

The above information is presented as background information only to assist with an understanding of the disclosure. No determination has been made, and no assertion is made, as to whether any of the above might be applicable as prior art with regard to the disclosure.

SUMMARY

According to various embodiments of the disclosure, a transmission device and a reception device transmitting and receiving messages may mutually provide security information (for example, public keys) to use end-to-end encryption. For example, the transmission device may generate a public key for encrypting a message and encrypt the message by using the public key. The transmission device may transmit the encrypted message to the reception device through a message server, and the message server may store and manage the public key corresponding to the transmission device.

In general, in transmission and reception of messages, a separate message server for storing and managing security information (for example, public keys) for at least one electronic device may be needed. According to an embodiment of the disclosure, the separate message server may need a separate processing process for acquiring public keys corresponding to the transmission device and the reception device. Further, when the public keys are changed in the transmission device and the reception device, a separate processing process for updating and managing the changed public keys may be required. Due to the separate processing process, a problem of deteriorating the message transmission and reception performance of the transmission device and the reception device may occur.

Aspects of the disclosure are to address at least the above-mentioned problems. Accordingly, an aspect of the disclosure is to provide an electronic device for managing public key corresponding respective electronic devices (for example, the transmission device and the reception device) by using an rich communication service (RCS) server supporting rich communication service (RCS) and encrypting messages based on the public keys.

Additional aspects will be set forth in part in the description which follows and, in part, will be apparent from the description, or may be learned by practice of the presented embodiments.

In accordance with an aspect of the disclosure, a message server is provided. The message server includes a communication module configured to communicate with a first electronic device and a second electronic device, a memory configured to store security information related to at least one electronic device, and a server processor operatively connected to the communication module and the memory. The server processor may be configured to acquire a first message encrypted based on first security information of the second electronic device from the first electronic device and transmit the first message to the second electronic device, acquire a decryption failure signal for the first message from the second electronic device and transmit the decryption failure signal to the first electronic device, acquire second security information of the second electronic device from the second electronic device and transmit the second security information to the first electronic device, receive a second message encrypted based on the second security information from the first electronic device, and transmit the received second message to the second electronic device.

In accordance with another aspect of the disclosure, a first electronic device is provided. The first electronic device includes a communication module configured to perform wireless communication with a message server and a second electronic device, a memory configured to store security information acquired from the message server, and at least one processor operatively connected to the communication module and the memory. The at least one processor may be configured to encrypt a first message, based on first security information of the second electronic device for transmitting the first message, transmit the encrypted first message to the second electronic device through the message server, receive a decryption failure signal for the first message from the second electronic device through the message server, receive second security information corresponding to the second electronic device from the second electronic device, and encrypt a second message, based on the received second security information and transmit the second message to the second electronic device.

In accordance with another aspect of the disclosure, a method of encrypting a message through a message server is provided. The method includes acquiring a first message encrypted based on first security information of a second electronic device from a first electronic device and transmitting the first message to the second electronic device, acquiring a decryption failure signal for the first message from the second electronic device and transmitting the decryption failure signal to the first electronic device, acquiring second security information of the second electronic device from the second electronic device and transmitting the second security information to the first electronic device, receiving a second message encrypted based on the second security information from the first electronic device, and transmitting the received second message to the second electronic device.

An aspect of various embodiments of the disclosure is to not configure a separate server for storing security information, manage the security information through a message server, and encrypt the message when messages are transmitted and received between electronic devices.

According to various embodiments of the disclosure, since the separate server is not configured, costs can be saved. The message server may support encryption of messages through an algorithm that stores and manages security information for electronic devices. In addition, various effects directly or indirectly detected through the disclosure can be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
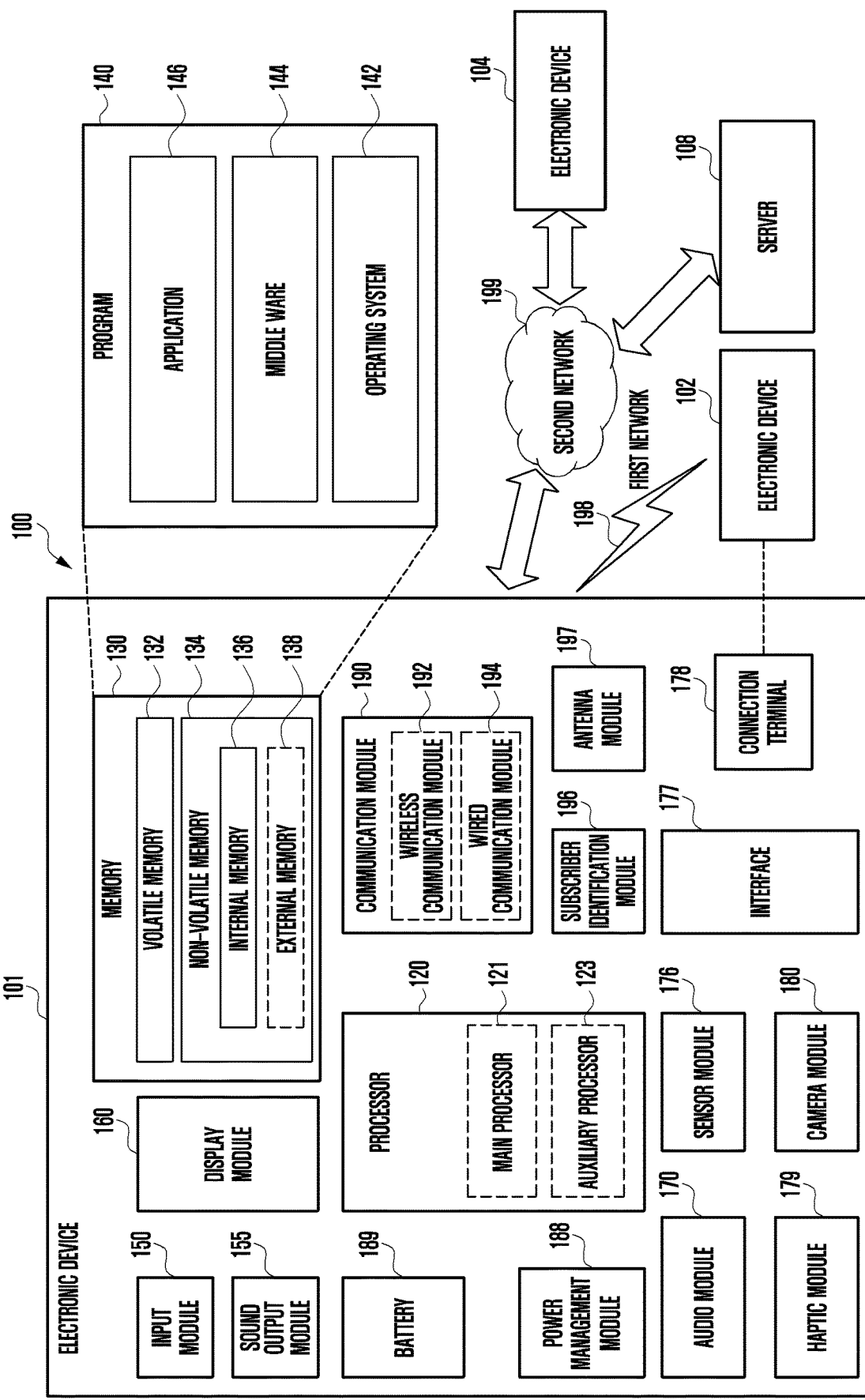
FIG. 1 is a block diagram illustrating an electronic device within a network environment according to an embodiment of the disclosure.

FIG. 1 illustrates an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). The electronic device 101 may communicate with the external electronic device 104 via the server 108. The electronic device 101 includes a processor 120, a memory 130, an input module 150, an audio output module 155, a display module 160, an audio module 170, a sensor module 176, an interface 177, a connecting terminal 178, a haptic module 179, a camera module 180, a power management module 188, a battery 189, a communication module 190, a subscriber identity module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The audio output module 155 may output sound signals to the outside of the electronic device 101. The audio output module 155 may include, for example, a speaker or a receiver. The speaker may be used for general purposes, such as playing multimedia or playing record. The receiver may be used for receiving incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include a touch sensor adapted to detect a touch, or a pressure sensor adapted to measure the intensity of force incurred by the touch.

The audio module 170 may convert a sound into an electrical signal and vice versa. The audio module 170 may obtain the sound via the input module 150, or output the sound via the audio output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the external electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
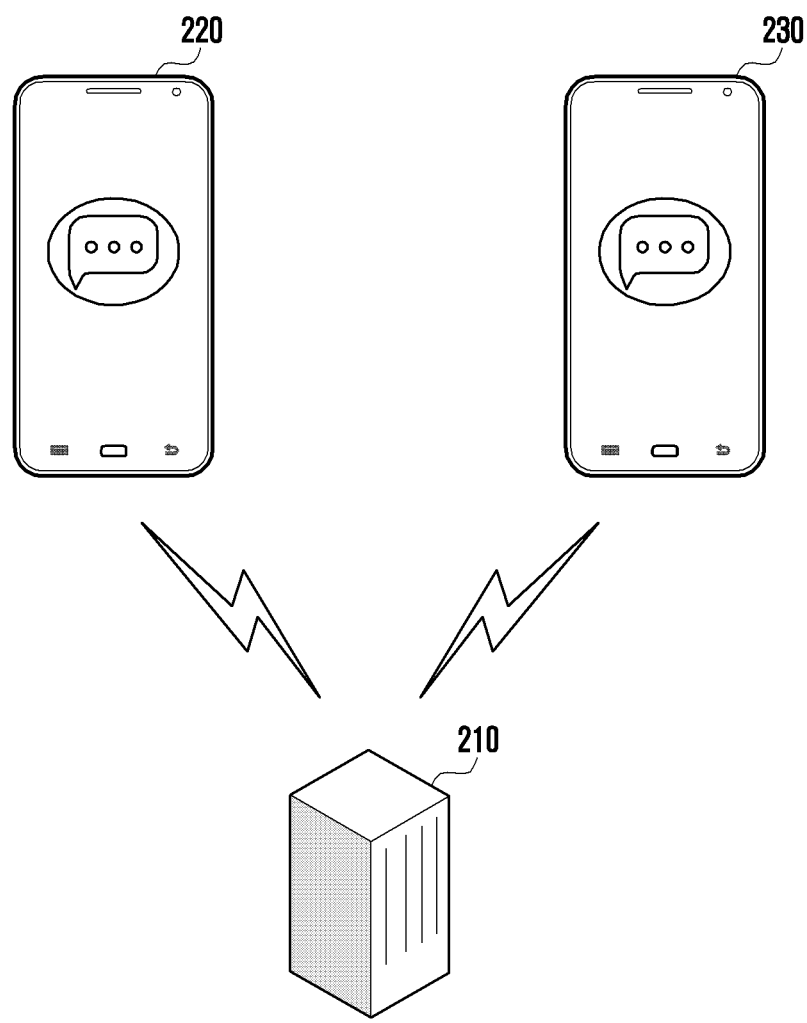
FIG. 2 illustrates a process of transmitting and receiving messages through a message server according to an embodiment of the disclosure.

FIG. 2 illustrates a process of transmitting and receiving message through a message server according to an embodiment of the disclosure.

Referring to FIG. 2, according to various embodiments of the disclosure, a first electronic device 220 may be operatively connected to a second electronic device 230 and may perform wireless communication. When transmitting the message to the second electronic device 230, the first electronic device 220 may be at least partially controlled by a message server 210. For example, the first electronic device 220 may transmit information related to the message and information related to the second electronic device 230 (for example, identification information of the second electronic device 230) corresponding to a reception device of the message to the message server 210. The message server 210 may transfer the message to the second electronic device 230 based on the information received from the first electronic device 220.

According to an embodiment of the disclosure, the message server 210 may include a server for providing rich communication suite (RCS) corresponding to an IP-based text service among wireless communication schemes between electronic devices. The RCS is the international standard adapted by global system for mobile communication association (GSMA) and may be defined as a text service that is the next version of a universally and frequently used text service (for example, SMS or MMS). According to an embodiment of the disclosure, the RCS may include a user-network interface (UNI) between the electronic devices 220 and 230 and the message server 210. The message server 210 may be referred to as an RCS server. According to an embodiment of the disclosure, state (presence) information of a counterpart may be reflected in a database in the RCS, and the RCS server may transfer a text message to the counterpart based on the state information stored in the database. For example, the state information of the counterpart may include data (for example, public key information and private key information) corresponding to a specific electronic device (for example, a counterpart electronic device). According to an embodiment of the disclosure, the message server 210 may acquire state information of the first electronic device 220 and state information of the second electronic device 230, store the acquired state information in the memory of the message server 210, and manage the same.

According to an embodiment of the disclosure, in transmission/reception of messages between the first electronic device 220 and the second electronic device 230, an end-to-end encryption technology (for example, E2EE) may be applied. The end-to-end encryption may be defined as an encryption scheme in which messages are transmitted in an encrypted state during all processes from a transmission device which transmits messages to a reception device which receives the messages.

According to an embodiment of the disclosure, when writing a message and transmitting the same to second electronic device 230, the first electronic device 220 may encrypt the message and transmit the encrypted message to the second electronic device 230 through the message server 210. Each of the first electronic device 220 and the second electronic device 230 may generate its own "asymmetric public key" and "asymmetric private key", and use the keys for an operation of encrypting the message and an operation of decrypting the message. The first electronic device 220 and the second electronic device 230 may share "asymmetric public keys" through the message server 210. According to an embodiment of the disclosure, the first electronic device 220 may encrypt the message based on the "asymmetric public key" of another electronic device (for example, the second electronic device 230) and transmit the encrypted message to the other electronic device. At this time, the other electronic device (for example, the second electronic device 230) may decrypt the encrypted message based on its own "asymmetric private key". According to an embodiment of the disclosure, the "asymmetric public key" and the "asymmetric private key" have the correlation therebetween, and the message encrypted by the "asymmetric public key" may be decrypted using the "asymmetric private key".

According to an embodiment of the disclosure, the first electronic device 220 and the second electronic device 230 may provide their own "asymmetric public keys" to the message server 210 when accessing the message server 210. For example, when the first electronic device 220 accesses the message server 210, the first electronic device 220 may transmit first security information (for example, a first asymmetric public key) to the message server 210, and the message server 210 may store the first security information in the database. When the second electronic device 230 accesses the message server 210, the second electronic device 230 may transmit second security information (for example, a second asymmetric public key) to the message server 210, and the message server 210 may store the second security information in the database. According to an embodiment of the disclosure, the first electronic device 220 may access the message server 210 in order to transmit the message to the second electronic device 230, and the message server 210 may provide the second security information (for example, the second asymmetric public key) of the second electronic device 230 stored in the database to the first electronic device 220.

According to an embodiment of the disclosure, when the first electronic device 220 transmits a first message to the second electronic device 230, the first electronic device 220 may encrypt the first message based on the second security information (for example, the second asymmetric public key) of the second electronic device 230 and transmit the encrypted first message to the second electronic device 230 through the message server 210. The second electronic device 230 may acquire the first message of the first electronic device 220 through the message server 210. According to an embodiment of the disclosure, the second electronic device 230 may decrypt the first message based on its own second asymmetric private key. According to an embodiment of the disclosure, the first message which the first electronic device 220 transmits to the second electronic device 230 cannot be identified by the message server 210 but can be identified by the second electronic device 230 after a decryption process by the second electronic device 230. According to an embodiment of the disclosure, when the message is transmitted, security can be enhanced using the end-to-end encryption.

Figure 3:
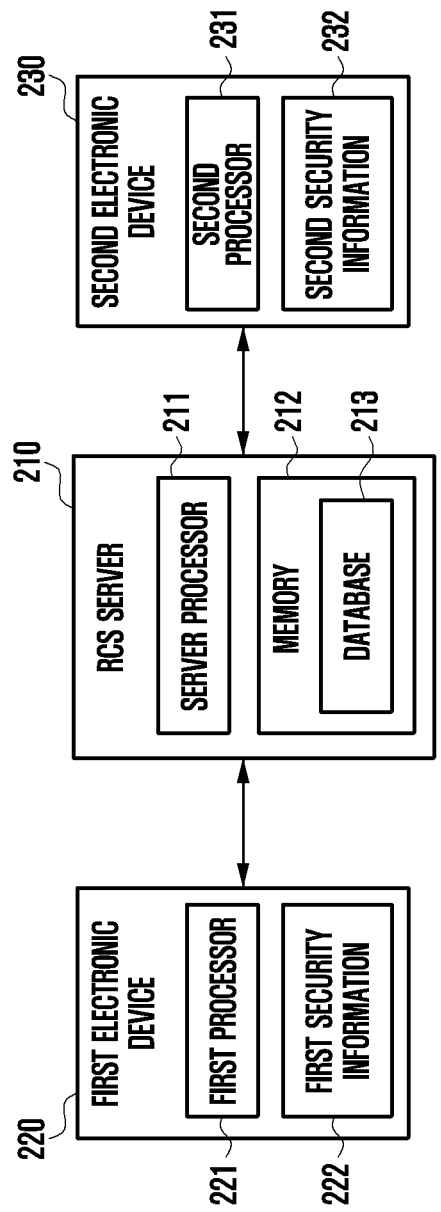
FIG. 3 is a block diagram illustrating a first electronic device, a second electronic device, and a message server according to an embodiment of the disclosure.

FIG. 3 is a block diagram illustrating a first electronic device, a second electronic device, and a message server according to an embodiment of the disclosure.

Referring to FIG. 3, the first electronic device 220 (for example, the electronic device 101 of FIG. 1) may include a first processor 221 and/or first security information 222, and the second electronic device 230 may include a second processor 231 and/or second security information 232. The first electronic device 220 and the second electronic device 230 may equally include at least one element and may be classified as substantially the same device. According to an embodiment of the disclosure, the first electronic device 220 and the second electronic device 230 may transmit and receive at least one piece of data through the RCS server 210 (for example, the server 108 of FIG. 1 and/or the message server).

According to an embodiment of the disclosure, the first electronic device 220 may generate an asymmetric public key and an asymmetric private key included in the first security information 222, and the second electronic device 230 may generate an asymmetric public key and an asymmetric private key included in the second security information 232. According to an embodiment of the disclosure, respective electronic devices may generate their own asymmetric public keys and asymmetric private keys and mutually exchange the asymmetric public keys through the RCS server 210.

According to an embodiment of the disclosure, when the first electronic device 220 desires to transmit an encrypted message to the second electronic device 230, the first electronic device 200 may encrypt the first message by using the asymmetric public key of the second electronic device 230 and transmit the encrypted first message to the second electronic device 230. The second electronic device 230 may decrypt the encrypted first message by using its own asymmetric private key (of the second electronic device). According to another embodiment of the disclosure, when the second electronic device 230 desires to transmit an encrypted second message to the first electronic device 220, the second electronic device 230 may encrypt the second message by using the asymmetric public key of the first electronic device 220 and transmit the encrypted second message to the first electronic device 220. The first electronic device 220 may decrypt the encrypted second message by using its own asymmetric private key (of the first electronic device).

Referring to FIG. 3, the RCS server 210 (for example, the server 108 of FIG. 1 and/or the message server) may include a server processor 211 and/or a memory 212. The server processor 211 may at least partially control at least one other element (for example, a hardware or software element) of the RCS server 210 and perform various data processing and/or calculations. According to an embodiment of the disclosure, the server processor 211 of the RCS server 210 may receive the first security information 222 of the first electronic device 220 from the first electronic device 220 and store the first security information 222 in the database 213 of the memory 212. In the case of the second electronic device 230, the server processor 211 may also receive the second security information 232 of the second electronic device 230 from the second electronic device 230 and store the second security information 232 in the database 213 of the memory 212. The server processor 211 may store security information corresponding to each electronic device in the database 213 and, when the security information is changed, update the security information stored in the database 213. For example, when the first electronic device 210 accesses the RCS server 210, the server processor 211 may receive the first security information 222 from the first electronic device 210 and compare and/or analyze the first security information 222 and security information pre-stored in the database 213. When the first security information 222 does not match the pre-stored security information, the server processor 211 may update the security information stored in the database 213 to the first security information 222.

According to an embodiment of the disclosure, when accessing the RCS server 210, the first electronic device 220 and the second electronic device 230 may provide their own security-related information (for example, the first security information 222 of the first electronic device 220 and/or the second security information 232 of the second electronic device 230) to the RCS server 210. According to an embodiment of the disclosure, the security information may include a public key (for example, an asymmetric public key) corresponding to each electronic device. For example, when the first electronic device 220 desires to transmit a message to the second electronic device 230, the RCS server 210 may provide the asymmetric public key of the second electronic device 230 to the first electronic device 220. The first electronic device 220 may encrypt the message based on the asymmetric public key and transmit the encrypted message to the second electronic device 230 through the RCS server 210. The asymmetric public key may be used for encrypting a specific message.

According to an embodiment of the disclosure, when the first electronic device 220 transmits a message to the second electronic device 230, the first electronic device 220 may acquire second security information 232 (For example, the asymmetric public key of the second electronic device 230) corresponding to the second electronic device 230 from the RCS server 210. After encrypting the message based on the acquired second security information 232, the first electronic device 220 may transmit the encrypted message to the second electronic device 230 through the RCS server 210. According to an embodiment of the disclosure, when the second security information 232 is not changed in the second electronic device 230, the second electronic device 230 may decrypt the encrypted message transmitted from the first electronic device 220 by using the asymmetric private key of the second electronic device 230. According to an embodiment of the disclosure, when the second security information 232 is changed in the second electronic device 230, the second electronic device 230 cannot decrypt the encrypted message transmitted from the first electronic device 220. The second electronic device 230 may transmit an acquisition failure signal of the message to the first electronic device 220 through the RCS server 210. According to an embodiment of the disclosure, the second electronic device 230 may transmit the changed second security information 232 (for example, new security information or a new asymmetric public key of the second electronic device 230) along with the acquisition failure signal to the RCS server 210. The RCS server 210 may transfer the changed second security information 232 (for example, new security information) to the first electronic device 220. The RCS server 210 may update security information corresponding to the second electronic device 230 stored in the database 213 to the changed second security information 232. According to an embodiment of the disclosure, the first electronic device 220 may acquire the changed second security information 232 from the second electronic device 230 and encrypt the message based on the changed second security information 232. According to an embodiment of the disclosure, the first electronic device 220 may encrypt the message based on the changed second security information 232 and transmit the encrypted message to the second electronic device 230. The second electronic device 230 may decrypt the encrypted message by using its own asymmetric private key.

According to an embodiment of the disclosure, when generating and transmitting the message to the second electronic device 230, the first electronic device 220 may add a security field (for example, a message header field) based on a message-related packet. For example, the security field may be defined as a field for identifying whether the message is encrypted. According to an embodiment of the disclosure, when the security field is included in the message-related packet, it may be identified that the transmitted message is encrypted.

According to an embodiment of the disclosure, the first electronic device 220 may generate a symmetric private key and open a group chat room based on the symmetric private key. When inviting the second electronic device 230 to the group chat room, the first electronic device 220 may transfer the symmetric private to the second electronic device 230. For example, the first electronic device 220 may acquire an asymmetric public key corresponding to the second electronic device 230 through the RCS server 210, and the symmetric private key may be encrypted based on the acquired asymmetric public key. The first electronic device 220 may transfer the encrypted symmetric private key to the second electronic device 230. According to an embodiment of the disclosure, the second electronic device 230 may receive the encrypted symmetric private key from the first electronic device 220 and decrypt the encrypted symmetric private key by using its own asymmetric private key. According to an embodiment of the disclosure, the second electronic device 230 may participate in the group chat room by using a symmetric private key corresponding to the group chat room and share message with other electronic devices participating in the group chat room.

According to an embodiment of the disclosure, each electronic device participating in the group chat room may encrypt the message by using the symmetric private key corresponding to the group chat room and transfer the encrypted message to the other electronic devices participating in the group chat room. The other electronic devices may decrypt the encrypted message by using the pre-acquired symmetric private key corresponding to the group chat room.

According to an embodiment of the disclosure, the RCS server 210 may manage the group chat room and identify at least one electronic device participating in the group chat room.

The message server 210 according to various embodiments includes a communication module for communicating with the first electronic device 220 and the second electronic device 230, the memory 212 for storing security information related to at least one electronic device, and a server processor 211 operatively connected to the communication module and the memory 212. The server processor 211 may acquire a first message encrypted based on first security information (for example, the second security information 232) of the second electronic device 230 from the first electronic device 220, transmit the first message to the second electronic device 230, acquire a decryption failure signal for the first message from the second electronic device 230, transmit the decryption failure signal to the first electronic device 220, acquire second security information of the second electronic device 230 (for example, the current asymmetric public key of the second electronic device 230) from the second electronic device 230, transmit the second security information to the first electronic device 220, receive a second message encrypted based on the second security information from the first electronic device 220, and transmit the received second message to the second electronic device 230.

According to an embodiment of the disclosure, the server processor 211 may acquire security information related to at least one electronic device in response to access of the at least one electronic device to the message server 210 and store the acquired security information in the memory 212.

According to an embodiment of the disclosure, the server processor 211 may make a request for the security information to the second electronic device 230 in response to the decryption failure signal for the first message and acquire the second security information from the second electronic device 230.

According to an embodiment of the disclosure, the server processor 211 may identify whether the first message is encrypted based on whether there is a field including security information in at least one field included in the first message.

According to an embodiment of the disclosure, the first security information may include at least one piece of public key information for encrypting the first message and private key information for participating in a chat room.

According to an embodiment of the disclosure, the server processor 211 may receive an invite message for participating in a group chat room from the first electronic device 220, identify a third electronic device participating in the group chat room in response to a request signal, and transmit the invite message to the third electronic device.

According to an embodiment of the disclosure, the invite message may include a message in which a private key (for example, a symmetric private key) corresponding to the group chat room is encrypted, based on security information of the third electronic device.

The first electronic device 220 according to various embodiments may include a communication module for performing wireless communication with the message server 210 and the second electronic device 230, a memory for storing security information acquired from the message server 210, and a processor (for example, the first processor 221) operatively connected to the communication module and the memory. The first processor 221 may encrypt the first message based on first security information (for example, the second security information 232) of the second electronic device 230 for transmitting the first message, transmit the encrypted first message to the second electronic device 230 through the message server 210, receive a decryption failure signal for the first message from the second electronic device 230, receive second security information corresponding to the second electronic device 230 from the second electronic device 230, encrypt the second message based on the received second security information, and transmit the second message to the second electronic device 230.

According to an embodiment of the disclosure, the first processor 221 may count the number of generations of the decryption failure signal for the first message and, when the number of generations exceeds a configured threshold value, display a notification related to transmission of the first message.

According to an embodiment of the disclosure, when the number of generations exceeds the configured threshold value, the first processor 221 may generate a third message and transmit the third message to the second electronic device 230.

According to an embodiment of the disclosure, the first processor 221 may add a field including the first security information to at least one field included in the first message and record security information in the added field to transmit the security information to the message server 210.

According to an embodiment of the disclosure, the first security information may include at least one piece of public key information for encrypting the first message and private key information for participating in a chat room.

Figure 4:
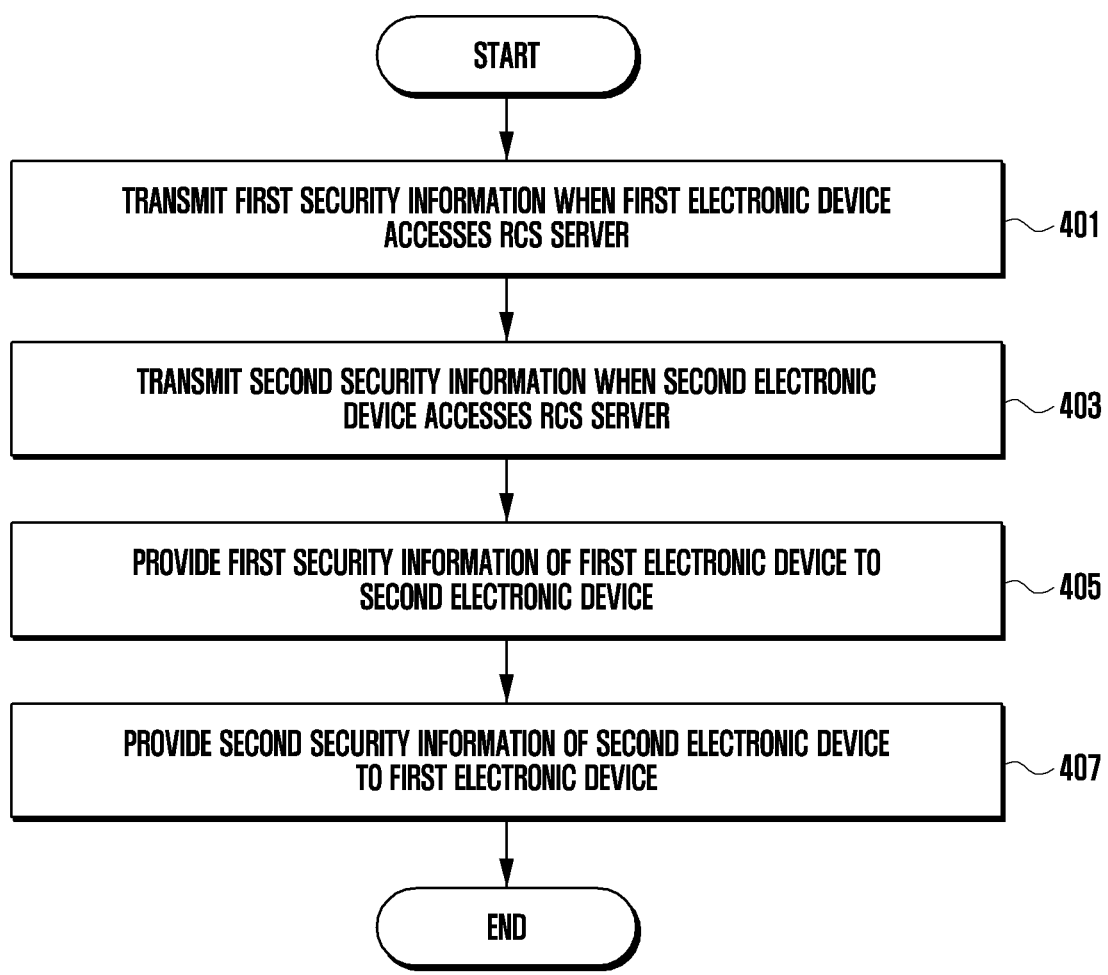
FIG. 4 is a flowchart illustrating a method by which a message server manages security information according to an embodiment of the disclosure.

FIG. 4 is a flowchart illustrating a method by which a message server manages security information according to an embodiment of the disclosure.

Referring to FIG. 4, according to various embodiments of the disclosure, a message server (for example, the message server 210 of FIG. 2 or the RCS server 210 of FIG. 3) may acquire security information corresponding to at least one electronic device accessing the message server 210 and store the security information in a database (for example, the database 213 of FIG. 3) of a memory (for example, the memory 212 of FIG. 3). According to an embodiment of the disclosure, when at least one electronic device is registered in the message server, the at least one electronic device may access the message server 210 and provide security information to the message server 210. For example, the security information may include unique data (for example, a public key and/or a private key) corresponding to at least one electronic device. According to an embodiment of the disclosure, when the first electronic device 220 transmits a message to the second electronic device 230, the message server 210 may provide security information (for example, the second security information 232 of FIG. 3) of the second electronic device 230 to the first electronic device 220. According to an embodiment of the disclosure, the message server 210 may acquire security information (for example, an asymmetric public key) of at least one electronic device and update security information stored in the database whenever the at least one electronic device accesses the message server 210.

When accessing the RCS server (for example, the message server 210), the first electronic device 220 may transmit first security information (for example, the first security information 222 of FIG. 3 or the asymmetric public key of the first electronic device 220) corresponding to the first electronic device 220 to the RCS server 210 in operation 401.

When accessing the RCS server (for example, the message server 210), the second electronic device 230 may transmit second security information (for example, the second security information 232 of FIG. 3 or the asymmetric public key of the second electronic device 230) corresponding to the second electronic device 230 to the RCS server 210 in operation 403.

The RCS server 210 may provide the first security information of the first electronic device 220 to the second electronic device 230 in operation 405 and provide the second security information of the second electronic device 230 to the first electronic device 220 in operation 407. According to an embodiment of the disclosure, the RCS server 210 may manage the security information to allow the first electronic device 220 and the second electronic device 230 to share the security information.

According to an embodiment of the disclosure, the first electronic device 220 may acquire the second security information 232 corresponding to the second electronic device 230 through the RCS server 210. When transmitting the message to the second electronic device 230, the first electronic device 220 may encrypt the message based on the second security information 232 (for example, the asymmetric public key of the second electronic device 230) and transmit the encrypted message to the second electronic device 230. When receiving the encrypted message, the second electronic device 230 may decrypt the encrypted message by using its own asymmetric private key.

According to an embodiment of the disclosure, when the second electronic device 230 desires to transmit the message to the first electronic device 220, the second electronic device 230 may acquire the first security information 222 (for example, the asymmetric public key of the first electronic device 220) corresponding to the first electronic device 220 through the RCS server 210. For example, when transmitting the message to the first electronic device 220, the second electronic device 230 may acquire RCS capability information (for example, an RCS capability packet) corresponding to the first electronic device 220, and the RCS capability information may include the asymmetric public key of the first electronic device 220. The second electronic device 230 may encrypt the message based on the asymmetric public key of the first electronic device 220 included in the RCS capability information and transmit the encrypted message to the first electronic device 220. When receiving the encrypted message, the first electronic device 220 may decrypt the encrypted message by using its own asymmetric private key.

According to another embodiment of the disclosure, the first electronic device 220 may generate new security information (for example, a new asymmetric public key and/or a new asymmetric private key of the first electronic device) and, when accessing the RCS server 210, transfer the new asymmetric public key to the RCS server 210. When the new asymmetric public key is transmitted, the RCS server 210 may update the asymmetric public key of the first electronic device 220 stored in the database to the new asymmetric public key. According to an embodiment of the disclosure, the RCS server 210 may provide security information (for example, an asymmetric public key) of another electronic device to at least one electronic device accessing the RCS server 210.

Figure 5:
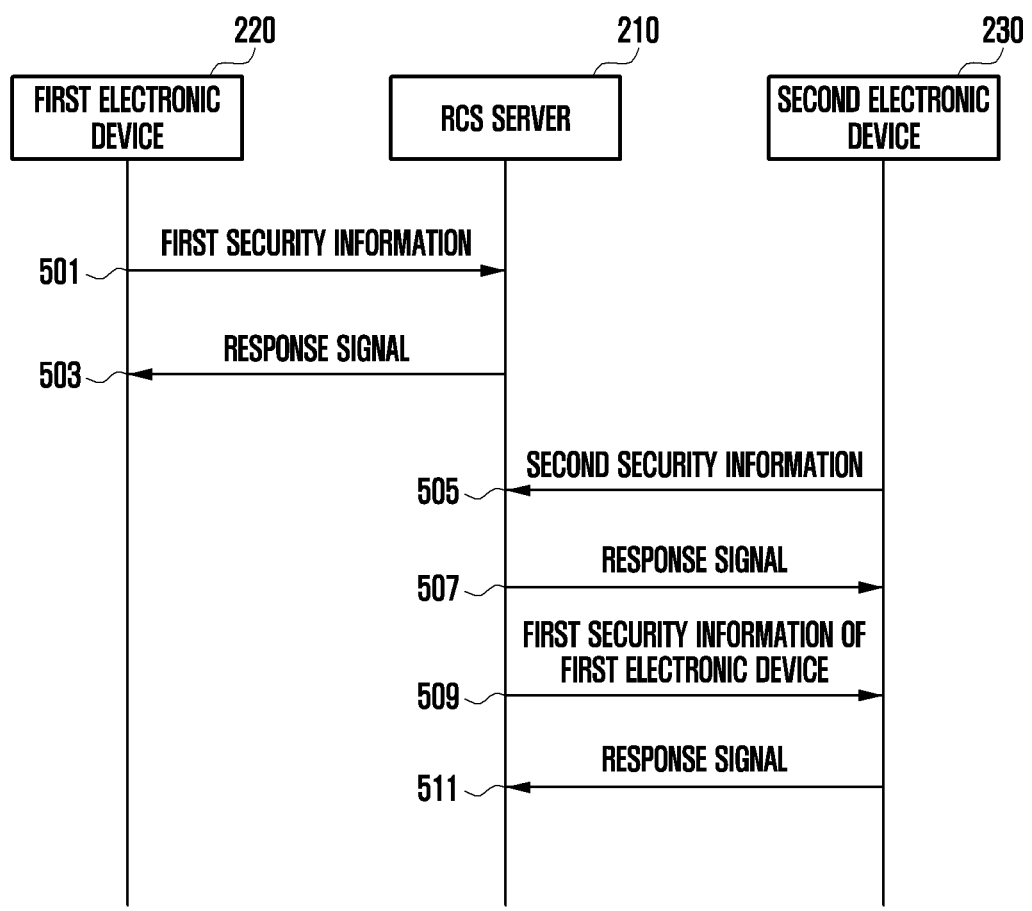
FIG. 5 is a timetable illustrating a process in which a message server manages security information according to an embodiment of the disclosure.

FIG. 5 is a timetable illustrating a process in which a message server manages security information according to an embodiment of the disclosure.

Referring to FIG. 5, a process in which the RCS server 210, the first electronic device 220, and/or the second electronic device 230 transmit and receive security information is illustrated. The RCS server 210 may include a server supporting message transmission and reception services according to an RCS scheme.

When the first electronic device 220 accesses the RCS server 210, the first electronic device 220 may transmit first security information (for example, the first security information 222 of FIG. 3 or the asymmetric public key of the first electronic device 220) to the RCS server 210 in operation 501. For example, the first security information 222 may include unique public key and private key corresponding to the first electronic device 220. In operation 503, the RCS server 210 may transmit a response signal to the first electronic device 220 in response to acquisition of the first security information 222.

When the second electronic device 230 accesses the RCS server 210, the second electronic device 230 may transmit second security information (for example, the second security information 232 of FIG. 3 or the asymmetric public key of the second electronic device 230) to the RCS server 210 in operation 505. For example, the second security information 232 may include unique public key and private key corresponding to the second electronic device 230. In operation 507, the RCS server 210 may transmit a response signal to the second electronic device 230 in response to acquisition of the second security information 232.

In operation 509, the RCS server 210 may identify the first electronic device 220 operatively connected to the second electronic device 230 and provide the first security information 222 (for example, the asymmetric public key of the first electronic device 220) corresponding to the first electronic device 220 to the second electronic device 230. For example, the RCS server 210 may identify the first electronic device 220 based on contact information stored in the second electronic device 230 and transmit the first security information 222 corresponding to the first electronic device 220 to the second electronic device 230. In operation 511, the second electronic device 230 may transmit a response signal tot eh RCS server 210 in response to reception of the first security information 222.

According to an embodiment of the disclosure, the first electronic device 220 and the second electronic device 230 may share security information through the RCS server 210. According to an embodiment of the disclosure, when the second electronic device 230 desires to transmit an encrypted message to the first electronic device 220, the second electronic device 230 may encrypt the message by using the first security information of the first electronic device 220. The second electronic device 230 may transmit the encrypted message to the first electronic device 220 through the RCS server 210 based on the first security information. According to an embodiment of the disclosure, when receiving the encrypted message, the first electronic device 220 may decrypt the encrypted message by using the asymmetric private key of the first electronic device 220. According to an embodiment of the disclosure, the first electronic device 220 and the second electronic device 230 may perform an encryption process and/or a decryption process for the message based on the shared security information.

Figure 6:
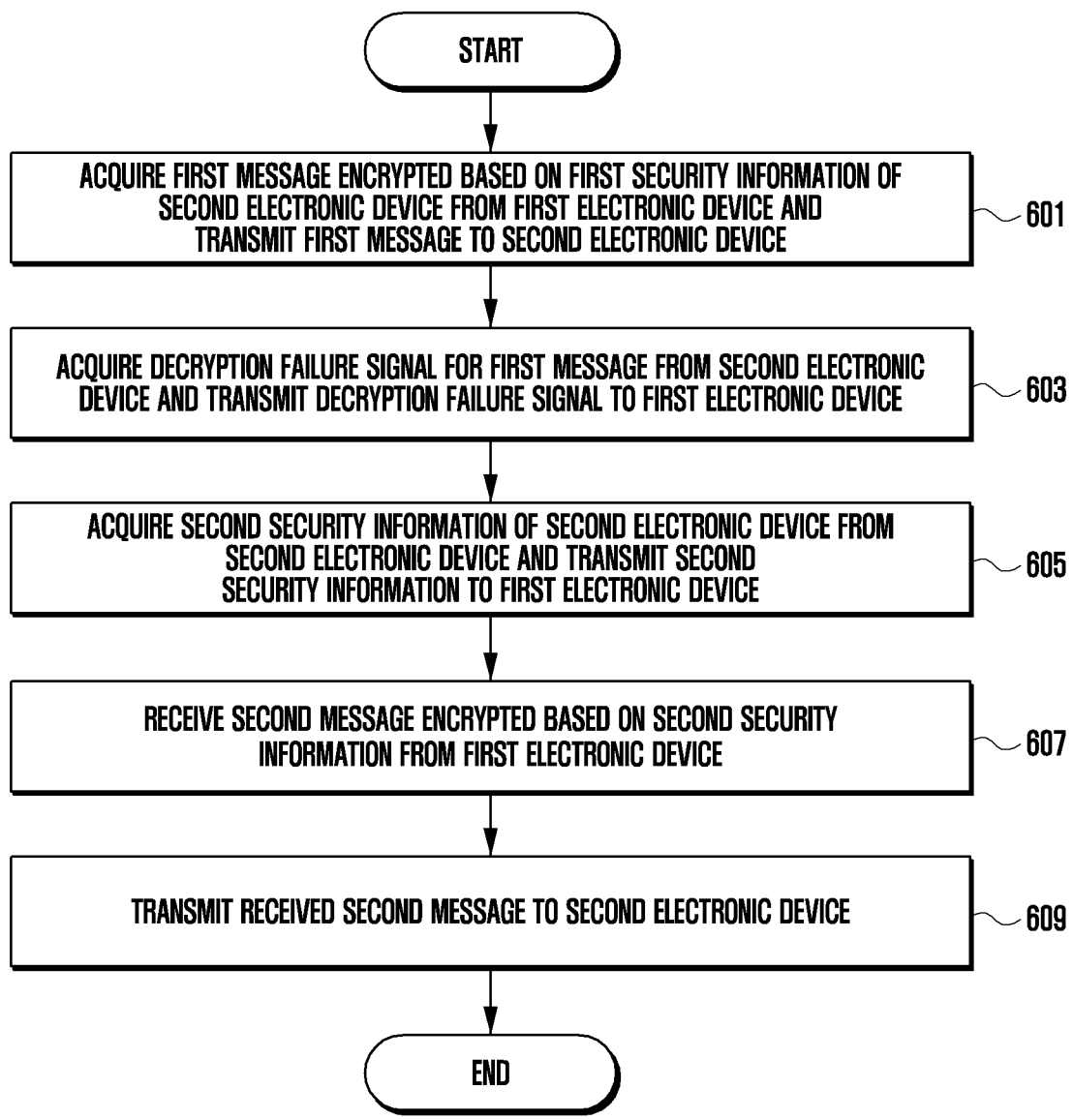
FIG. 6 is a flowchart illustrating a method of processing an encrypted message when decryption of an encrypted message fails according to an embodiment of the disclosure.

FIG. 6 is a flowchart illustrating a method of processing an encrypted message when decryption of an encrypted message fails according to an embodiment of the disclosure.

Referring to FIG. 6, according to various embodiments of the disclosure, a message server (for example, the message server 210 of FIG. 2 or the RCS server 210 of FIG. 3) may at least partially control a message transmission and reception process between a first electronic device (for example, the first electronic device 220 of FIG. 2) and a second electronic device (for example, the second electronic device 230 of FIG. 2). According to an embodiment of the disclosure, the message server 210 may manage security information of the first electronic device 220 (for example, the first security information 222 of FIG. 3 or the asymmetric public key of the first electronic device 220) and/or security information of the second electronic device 230 (for example, the second security information 232 of FIG. 3 or the asymmetric public key of the second electronic device 230). According to an embodiment of the disclosure, the message server 210 may store at least one piece of security information (for example, an asymmetric public key) for encryption and/or decryption of the message in a database (for example, the database 213 of FIG. 3) and provide the at least one piece of security information to at least one electronic device accessing the message server 210.

In operation 601, the message server 210 may acquire an encrypted first message based on first security information of the second electronic device 230 (for example, the asymmetric public key of the second electronic device 230) from the first electronic device 220 and transmit the first security information to the second electronic device 230. For example, the first electronic device 220 has already acquired the first security information of the second electronic device 230 (for example, the asymmetric public key of the second electronic device 230) through the message server 210 and encrypt the first message based on the first security information. The first electronic device 220 may transmit the encrypted first message to the second electronic device 230 through the message server 210. The second electronic device 230 may acquire the encrypted first message and transmit a response signal indicating whether the first message is successfully decrypted to the message server 210. For example, when the asymmetric public key of the second electronic device 230 is not changed, the second electronic device 230 may succeed in decoding the first message by using its own asymmetric private key. For example, when the asymmetric public key of the second electronic device 230 is changed, the second electronic device 230 may fail in decoding the first message. The second electronic device 230 may transmit a response signal indicating whether the first message is successfully decrypted to the message server 210.

In operation 603, the message server 210 may acquire a decryption failure signal for the first message from the second electronic device 230 and transmit the decryption failure signal to the first electronic device 220. For example, failure of the decryption of the first message may be the situation occurring when the first security information of the second electronic device 230 (for example, the asymmetric public key of the second electronic device 230) is changed. According to an embodiment of the disclosure, after transmitting the decryption failure signal for the first message to the message server 210, the second electronic device 230 may transmit second security information of the second electronic device 230 (for example, the changed asymmetric public key of the second electronic device 230) to the message server 210. According to another embodiment of the disclosure, when the message server 210 identifies the decryption failure signal, the message server 210 may transmit a signal making a request for second security information (for example, the current asymmetric public key of the second electronic device 230 and a new asymmetric public key of the second electronic device 230) to the second electronic device 230 and acquire the second security information from the second electronic device 230. According to another embodiment of the disclosure, the message server 210 may transmit the decryption failure signal to the first electronic device 220, and the first electronic device 220 may count the number of decryption failure. When the counted number of decryption failure exceeds a configured threshold value, the first electronic device 220 may display a notification related to transmission of the first message. For example, the first electronic device 220 may display a notification message related to transmission of the first message on a screen. According to another embodiment of the disclosure, when the counted number of decryption failure exceeds the configured threshold value, the first electronic device 220 may generate a third message which is not encrypted and transmit the third message to the second electronic device 230.

In operation 605, the message server 210 may acquire second security information of the second electronic device 230 (for example, the new asymmetric public key of the second electronic device 230) from the second electronic device 230 and transmit the second security information to the first electronic device 220. For example, the second security information may include changed security-related information (for example, the asymmetric public key) of the second electronic device 230. According to an embodiment of the disclosure, the message server 210 may update the first security information of the second electronic device 230 (for example, the asymmetric public key of the second electronic device 230) stored in the database to the second security information (for example, the new asymmetric public key of the second electronic device 230). According to an embodiment of the disclosure, when the first electronic device 220 accesses the message server 210, the first electronic device 220 may acquire the updated second security information of the second electronic device 230. According to an embodiment of the disclosure, the first electronic device 220 may use the second security information (for example, the new asymmetric public key of the second electronic device 230) during a process of encrypting the message to be transmitted to the second electronic device 230.

In operation 607, the message server 210 may receive a second message encrypted based on the second security information (for example, the new asymmetric public key of the second electronic device 230) from the first electronic device 220. According to an embodiment of the disclosure, the first electronic device 220 may transmit the second message encrypted based on the second security information to the second electronic device 230 through the message server 210.

In operation 609, the message server 210 may transmit the second message (for example, the message encrypted based on the second security information of the second electronic device 230) received from the first electronic device 220 to the second electronic device 230.

According to an embodiment of the disclosure, in transmission and reception of the encrypted message, when the message server 210 receives a decryption failure signal for the message, the message server 210 may perform a procedure for transmitting the encrypted message again. The message server 210 may store an algorithm for dealing with decryption failure of the message in a memory (for example, the memory 212 of FIG. 3). For example, when the second electronic device 230 fails in message description, the second electronic device 230 may transmit a response signal indicating the decryption failure to the message server 210. Thereafter, the second electronic device 230 may transmit security information including the changed asymmetric public key (for example, the new asymmetric public key) to the message server 210. According to an embodiment of the disclosure, when the first electronic device 220 accesses the message server 210 to retransmit the message to the second electronic device 230, the message server 210 may transfer the changed asymmetric public key of the second electronic device 230 to the first electronic device 220.

Figure 7:
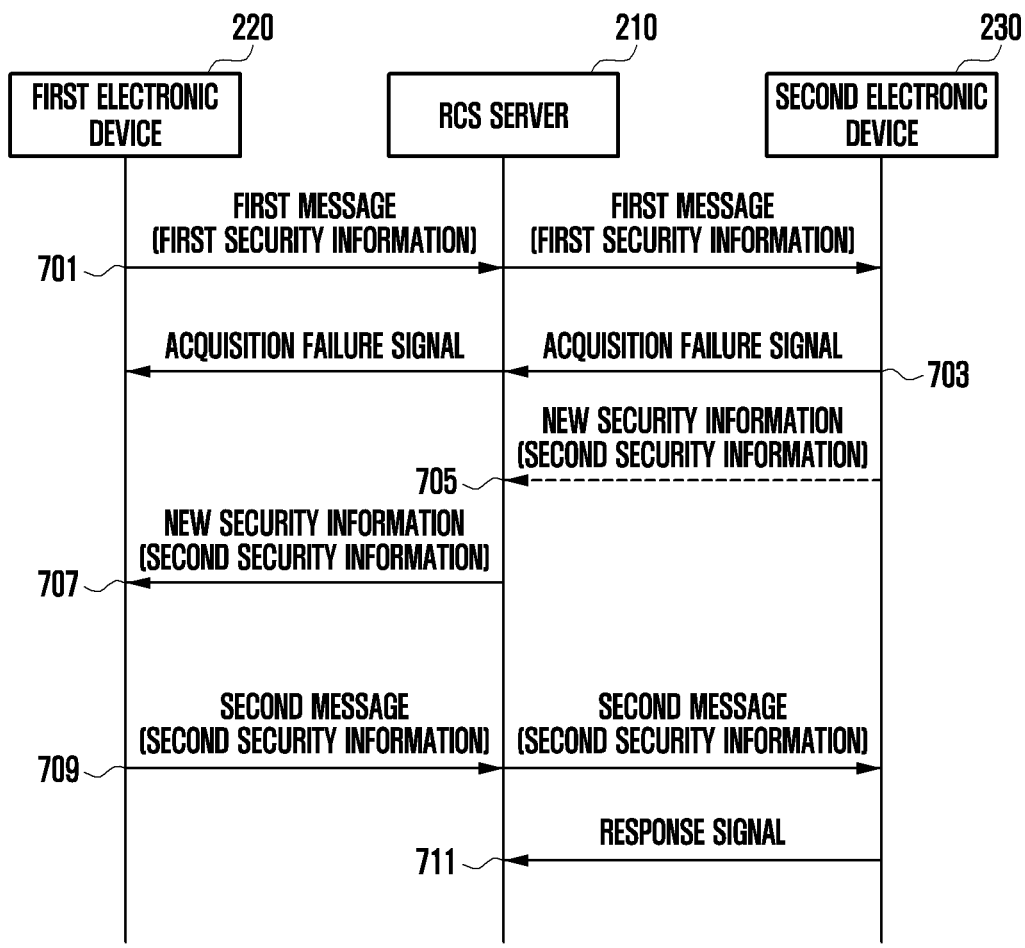
FIG. 7 is a timetable illustrating a process of processing an encrypted message when decryption of an encrypted message fails according to an embodiment of the disclosure.

FIG. 7 is a timetable illustrating a process of processing an encrypted message when decryption of an encrypted message fails according to an embodiment of the disclosure.

Referring to FIG. 7, according to various embodiments of the disclosure, an RCS server (for example, the message server 210 of FIG. 2 or the RCS server 210 of FIG. 3) may at least partially control a message transmission and reception process between a first electronic device (for example, the first electronic device 220 of FIG. 2) and a second electronic device (for example, the second electronic device 230 of FIG. 2). According to an embodiment of the disclosure, the RCS server 210 may manage security information (for example, the first security information 232 of FIG. 3) of the first electronic device 220 and/or security information (for example, the second security information 232 of FIG. 3) of the second electronic device 230. For example, when the first electronic device 220 accesses the RCS server 210, the RCS server 210 may acquire the security information (for example, an asymmetric public key) of the first electronic device. Further, when the second electronic device 230 accesses the RCS server 210 to transmit an encrypted message to the first electronic device 220, the RCS server 210 may provide the security information of the first electronic device 220 to the second electronic device 230. Referring to FIG. 7, the first electronic device 220 and the second electronic device 230 may be sharing security information through the RCS server 210. According to an embodiment of the disclosure, when receiving a decryption failure signal for the encrypted message during a process of transmitting and receiving the encrypted message, the RCS server 210 may at least partially control transmission and reception of the encrypted message based on an algorithm stored in a memory (for example, the memory 212 of FIG. 3).

In operation 701, the first electronic device 220 may transmit a first message to the second electronic device 230 through the RCS server 210. For example, the first message may be a message encrypted based on first security information of the second electronic device 230 (for example, an asymmetric public key of the second electronic device 230). Although not illustrated, when the first electronic device 220 desires to transmit a message to the second electronic device 230, the first electronic device 220 may access the RCS server 210 and acquire RCS capability information (for example, an RCS capability packet) corresponding to the second electronic device 230. For example, the RCS capability information may include the asymmetric public key of the second electronic device 230. The first electronic device 220 may encrypt the first message based on the asymmetric public key of the second electronic device 230 included in the RCS capability information and transmit the encrypted first message to the second electronic device 230.

In operation 703, the second electronic device 230 may fail in decrypting the first message transmitted from the first electronic device 220 and transmit a decryption failure signal for the first message to the first electronic device 220 through the RCS server 210. For example, when the security information (for example, the asymmetric public key) of the second electronic device 230 is changed, the second electronic device 230 may fail in the decryption operation of the first message encrypted based on the first security information. According to an embodiment of the disclosure, when decryption of the first message fails, the second electronic device 230 may transmit the decryption failure signal to the first electronic device 220 through the RCS server 210. According to anther embodiment of the disclosure, the first electronic device 220 may count the number of receptions of the decryption failure signal and, when the counted number exceeds a configured threshold value, display a notification related to transmission of the first message. For example, a notification message related to retransmission of the first message may be displayed. For example, the notification message may include an option for selecting whether to encrypt and transmit the first message or to transmit the first message without encryption. According to another embodiment of the disclosure, when the counted number exceeds the configured threshold value, the first electronic device 220 may generate a third message which is not encrypted and transmit the third message to the second electronic device 230.

In operation 705, the second electronic device 230 may transmit newly generated security information (for example, second security information, the current asymmetric public key of the second electronic device 230, and the new asymmetric public key) to the RCS server 210. According to another embodiment of the disclosure, operation 705 may be performed at the time point at which the second electronic device 230 accesses the RCS server 210 or may be performed before operation 701 to operation 703. When acquiring the newly generated security information (for example, second security information, the current asymmetric public key of the second electronic device 230, and the new asymmetric public key) from the second electronic device 230, the RCS server 210 may update the security information of the second electronic device 230 stored in a database (for example, the database 213 of FIG. 3). For example, the RCS server 210 may update the first security information stored in the database to the second security information.

Although not illustrated, the first electronic device 220 may access the RCS server 210 to retransmit the message to the second electronic device 230, and the first electronic device 220 may acquire second security information of the second electronic device 230 (for example, the new asymmetric public key of the second electronic device 230) from the RCS server 210. In operation 707, the RCS server 210 may transmit the newly generated security information (for example, the second security information of the second electronic device (the changed (updated) asymmetric public key and the new asymmetric public key)) to the first electronic device 220 in response to access of the first electronic device 220.

In operation 709, the first electronic device 220 may transmit a second message to the second electronic device 230 through the RCS server 210. For example, the second message may include a message encrypted based on the second security information of the second electronic device 220. The first electronic device 220 may generate the second message encrypted based on the second security information and transmit the second message to the second electronic device 230 through the RCS server 210.

When decryption of the second message is successful, the second electronic device 230 may transmit a response signal to the RCS server 210 in operation 711. For example, the second electronic device 230 may decrypt the second message based on the second security information and transmit a response signal corresponding to the decryption success to the RCS server 210.

According to an embodiment of the disclosure, the RCS server 210 may repeatedly perform an algorithm according to decryption failure for the message illustrated in FIG. 7. The first electronic device 220 may be in a state in which the timetable of FIG. 7 is stored in a memory (for example, the memory 130 of FIG. 1). According to an embodiment of the disclosure, the first electronic device 220 may repeatedly perform the process of the timetable of FIG. 7 a predetermined number of times through the RCS server 210 and, when the number exceeds the configured number, display a user interface including a notification message and determine whether to transmit the message according to selection. For example, when the number of message decryption failure exceeds three (for example, the configured number), the first electronic device 220 may display a user interface indicating message transmission failure through a display module (for example, the display module 160 of FIG. 1) and determine whether to retransmit the encrypted message. According to another embodiment of the disclosure, when the number of message decryption failure exceeds the configured number, the first electronic device 220 may transmit the message which is not encrypted to the second electronic device 230.

Figure 8:
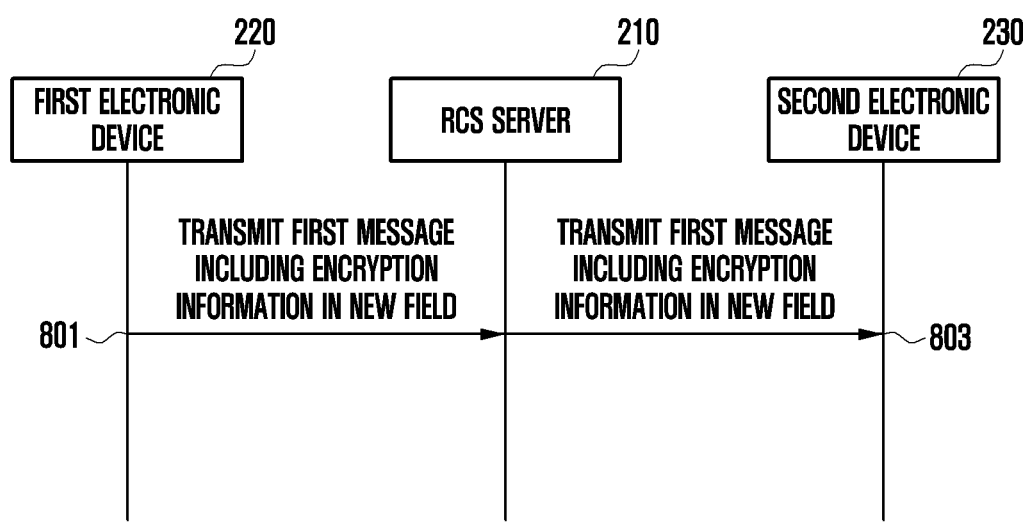
FIG. 8 is a timetable illustrating a process in which encryption information is inserted into a message and transmitted according to an embodiment of the disclosure.

FIG. 8 is a timetable illustrating a process in which encryption information is inserted into a message and transmitted according to an embodiment of the disclosure.

Referring to FIG. 8, an RCS server (for example, the message server 210 of FIG. 2 or the RCS server 210 of FIG. 3) may at least partially control a message transmission/reception process between a first electronic device (for example, the first electronic device 220 of FIG. 2) and a second electronic device (for example, the second electronic device 230 of FIG. 2). According to an embodiment of the disclosure, the RCS server 210 may receive an RCS capacity packet from the first electronic device 220 and transmit the RCS capacity packet to the second electronic device 230.

According to an embodiment of the disclosure, the RCS capacity packet may include capacity information and/or encryption information (for example, communication information, encryption information, public key information, and/or private key information) for the first electronic device 220 and/or the second electronic device 230 connected to the RCS server 210. The RCS capacity packet may include a plurality of fields, and at least one new field (for example, a message header field) of the plurality of fields may be added. For example, at least one new field may include security information (for example, encryption information) corresponding to the first electronic device 220 indicating whether the message is encrypted. According to an embodiment of the disclosure, the RCS capacity packet may be implemented as shown in Table 1 below.

TABLE 1

```
Publish sip:alice@samsung.com SIP/2.0
...
<?xml version="1.0" encoding="UTF-8"?>
<presence                                                 xmlns="urn:ietf:params:xml:ns:pidf"
xmlns:op="urn:oma:xml:prs:pidf:                                                    oma-pres"
entity="sip:alice@samsung.com">
<tuple id="EndtoEndEncryption">
    <status>
        <basic>open</basic>
    </status>
    <op:service-description>
        <op:service-id>endtoendencryption</op:service-id>
        <op:version> 1.0</op:version>
<op:publickey>S3DBDE2DX9DTDY6OJ4...</op:publickey>
        <op:description>EndtoEndEncryption</op:description>
    </op:service-description>
    <contact>sip:alice@samsung.com</contact>
</tuple>
```

Referring to Table 1, the first electronic device 220 may record security information (for example, the asymmetric public key (publickey) information of the first electronic device 220), such as "<op:publickey>S3DBDE2DX9DTDY6OJ4 . . . </op:publickey>" in the RCS capacity packet. According to an embodiment of the disclosure, when the first electronic device 220 transmits an encrypted message to the second electronic device 230, the RCS capacity packet may be transmitted to the RCS server 210. For example, the RCS capacity packet may include encryption information related to the message (for example, asymmetric public key information). According to an embodiment of the disclosure, the message may be transmitted in a packet form, and the message packet may include a field (for example, a message header field) indicating whether the message is an encrypted message. According to an embodiment of the disclosure, a reception device receiving the message may determine whether the message is encrypted based on the "message header field" of the message packet.

According to an embodiment of the disclosure, the RCS server 210 may identify whether there is the "message header field" in the message packet transmitted from the first electronic device 220 and identify whether the message is encrypted according to the existence or nonexistence of the "message header field". For example, when there is the "message header field" in the message packet, the message may be in an encrypted state. When there is no "message header field" in the data-related packet, the message may be a non-encrypted state.

In operation 801, the first electronic device 220 may transmit a first message (for example, a message packet) including encrypt information (for example, data indicating whether the message is an encrypted message or a non-encrypted message) in a new field (for example, a message header field) to the RCS server 210. The RCS server 210 may identify whether the first message is encrypted based on the message header field included in the first message (for example, the message packet). In operation 803, the RCS server 210 may transmit the first message to the second electronic device 230.

Figure 9:
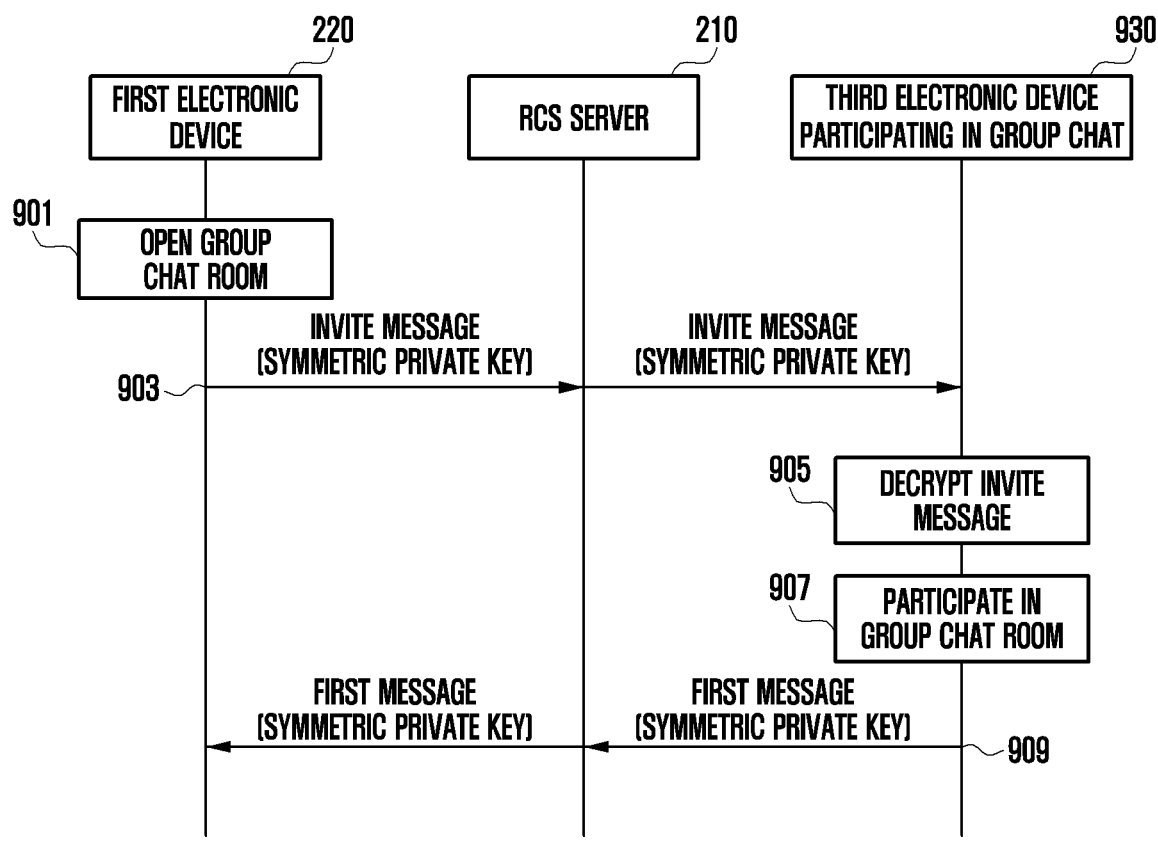
FIG. 9 is a timetable illustrating a process in which a first electronic device opens a group chat room and a third electronic device participates in a group chat room according to an embodiment of the disclosure.

FIG. 9 is a timetable illustrating a process in which a first electronic device opens a group chat room and a third electronic device participates in a group chat room according to an embodiment of the disclosure.

Referring to FIG. 9, according to various embodiments of the disclosure, an RCS server (for example, the message server 210 of FIG. 2 or the RCS server 210 of FIG. 3) may at least partially control a message transmission and reception process between a first electronic device (for example, the first electronic device 220 of FIG. 2) and the third electronic device 930 participating in a group chat room. According to an embodiment of the disclosure, the RCS server 210 may manage at least one group chat room. For example, the group chat room may be generated based on a private key (for example, a symmetric private key) corresponding to unique security information. According to an embodiment of the disclosure, the RCS server 210 may provide a private key corresponding to the group chat room to electronic devices participating in the group chat room.

In operation 901, the first electronic device 220 may open a group chat room. The group chat room may be defined as a virtual conversation space in which a plurality of electronic devices share conversation content. For example, the first electronic device 220 may generate a symmetric private key for encryption and decryption of messages shared in the group chat room and open a group chat room based on the symmetric private key. At least one electronic device participating in the group chat room may be in a state for sharing the symmetric private key. According to an embodiment of the disclosure, the first electronic device 220 may transmit a signal including the symmetric private key in a new field (for example, a message header field) to the RCS server 210 according to access to the RCS server 210.

According to an embodiment of the disclosure, the RCS server 210 may manage asymmetric public keys for at least one electronic device through the database. The RCS server 210 may provide the asymmetric public keys for the at least one electronic device to the first electronic device 220. According to an embodiment of the disclosure, the first electronic device 220 may encrypt the symmetric private key by using the asymmetric public keys for the at least one electronic device.

In operation 903, the first electronic device 220 may transmit an invite message for inviting to the group chat room to the third electronic device 930. For example, the invite message may include a message in which the symmetric private key of the group chat room is encrypted. The invite message may include the message in which the symmetric private key of the group chat room is encrypted based on the asymmetric public keys of at least one electronic device (for example, the third electronic device 930).

In operation 905, the third electronic device 930 may decrypt the invite message by using the asymmetric private key of the third electronic device 930. For example, the invite message may be a message encrypted based on the asymmetric public key of the third electronic device 930 and a message which can be decrypted based on the asymmetric private key of the third electronic device 930. In operation 907, the third electronic device 930 may acquire the symmetric private key corresponding to the group chat room, and may participate in the group chat room by using the symmetric private key. According to an embodiment of the disclosure, the third electronic device 930 may encrypt the message by using the symmetric private key corresponding to the group chat room and transfer the encrypted message to the group chat room.

In operation 909, the third electronic device 930 may transmit a first message encrypted using the symmetric private key to the group chat room. For example, at least one electronic device participating in the group chat room may decrypt the first message by using the symmetric private key and provide content of the first message to the user.

According to an embodiment of the disclosure, the RCS server 210 may be at least partially involved in managing the group chat room in which at least one electronic device participates.

According to another embodiment of the disclosure, in a method of encrypting a message, the first electronic device 220 may encrypt all messages transmitted through the RCS server 210 and transmit the encrypted messages to the second electronic device 230. For example, the RCS server 210 may provide security information (for example, an asymmetric public key) of the second electronic device 230 to the first electronic device 220, and the first electronic device 220 may encrypt all message transmitted to the second electronic device 230 by using the asymmetric public key of the second electronic device 230.

According to another embodiment of the disclosure, the first electronic device 220 may generate a plurality of group chat rooms and encrypt shared messages with respect to a specific group chat room. For example, the first electronic device 220 may encrypt conversation in the specific group chat room among the plurality of group chat rooms.

According to another embodiment of the disclosure, the first electronic device 220 may selectively encrypt only a specific message among the messages transmitted to the second electronic device 230.

According to another embodiment of the disclosure, the first electronic device 220 may identify specific phrases (for example, an account number, a residence registration number, a password, a preset word, and/or content required to be secured) included in messages to be transmitted to the second electronic device 230 and selectively encrypt only messages including the identified specific phrases. For example, the first electronic device 220 may encrypt messages including the identified specific phrases based on the asymmetric public key of the second electronic device 230 and transmit the encrypted messages to the second electronic device 230.

A method of encrypting a message through the message server 210 may include an operation of acquiring a first message encrypted on the basis first security information (for example, the second security information 232 of FIG. 3) of the second electronic device 230 from the first electronic device 220 and transmitting the first message to the second electronic device 230, an operation of acquiring a decryption failure signal for the first message from the second electronic device 230 and transmitting the decryption failure signal to the first electronic device 220, an operation of transmitting second security information (for example, a current asymmetric public key of the second electronic device 230) corresponding to the second electronic device 230 to the first electronic device 220, an operation of receiving a second message encrypted based on the second security information from the first electronic device 220, and an operation of transmitting the received second message to the second electronic device 230.

The method according to an embodiment may further include an operation of detecting access of at least electronic device to the message server 210, an operation of acquiring security information related to the at least one electronic device from the at least one electronic device in response to the access, and an operation of storing the acquired security information in a memory (for example, the memory 212 of the RCS server 210 of FIG. 3) of the message server 210.

The method according to an embodiment may further include an operation of making a request for security information to the second electronic device 230 in response to the decryption failure signal for the first message and an operation of acquiring the second security information from the second electronic device 230.

The method according to an embodiment may further include an operation of counting a number of generations of the decryption failure signal for the first message by the first electronic device and an operation of, when the number of generations exceeds a configured threshold value, displaying a notification related to transmission of the first message by the first electronic device 220.

The method according to an embodiment may further include an operation of identifying whether the first message is encrypted based on whether there is a field for recording security information in at least one field included in the first message.

According to an embodiment of the disclosure, the first security information may include at least one piece of public key information for encrypting the first message and private key information for participating in a chat room.

The method according to an embodiment may further include an operation of receiving an invite message for participating in a group chat room from the first electronic device 220, an operation of identifying a third electronic device participating in the group chat room in response to a request signal, and an operation of transmitting the invite message to the third electronic device.

According to an embodiment of the disclosure, the invite message may include a message in which a private key (for example, a symmetric private key) corresponding to the group chat room is encrypted, based on security information of the third electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as a memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A message server comprising:
   a communication circuit configured to communicate with a first electronic device and a second electronic device;
   memory configured to store security information related to at least one electronic device; and
   a server processor operatively connected to the communication circuit and the memory,
   wherein the server processor is configured to:
      acquire a first message encrypted based on first security information of the second electronic device from the first electronic device and transmit the first message to the second electronic device,
      acquire a decryption failure signal for the first message from the second electronic device and transmit the decryption failure signal to the first electronic device,
      acquire second security information of the second electronic device from the second electronic device and transmit the second security information to the first electronic device,
      receive a second message encrypted based on the second security information from the first electronic device, and
      transmit the received second message to the second electronic device.

2. The message server of claim 1, wherein the server processor is further configured to:
   acquire the security information related to the at least one electronic device in response to access of the at least one electronic device to the message server, and
   store the acquired security information in the memory.

3. The message server of claim 1, wherein the server processor is further configured to acquire the second security information from the second electronic device in response to the decryption failure signal for the first message.

4. The message server of claim 1, wherein the server processor is further configured to identify whether the first message is encrypted, based on whether a field including security information exists among at least one field included in the first message.

5. The message server of claim 1, wherein the first security information includes at least one piece of public key information for encrypting the first message and private key information for participating in a chat room.

6. The message server of claim 1,
   wherein the server processor is further configured to:
      receive an invite message for participating in a group chat room from the first electronic device,
      identify a third electronic device participating in the group chat room in response to a request signal, and
      transmit the invite message to the third electronic device.

7. The message server of claim 6, wherein the invite message includes a message in which a private key corresponding to the group chat room is encrypted, based on security information of the third electronic device.

8. A first electronic device comprising:
   a communication circuit configured to perform communication with a message server and a second electronic device;
   memory configured to store security information acquired from the message server; and
   at least one processor operatively connected to the communication circuit and the memory,
   wherein the at least one processor is configured to:
      encrypt a first message, based on first security information of the second electronic device, received from the message server, for transmitting the first message,
      transmit the encrypted first message to the second electronic device through the message server,
      receive a decryption failure signal for the first message from the second electronic device through the message server,
      receive second security information corresponding to the second electronic device from the second electronic device, via the message server, and
      encrypt a second message, based on the received second security information and transmit the second message to the second electronic device, via the message server.

9. The first electronic device of claim 8, wherein the at least one processor is further configured to:
   count a number of generations of the decryption failure signal for the first message; and in case that the number of generations exceeds a configured threshold value, display a notification related to transmission of the first message.

10. The first electronic device of claim 9, wherein the at least one processor is further configured to:
in case that the number of generations exceeds a configured threshold value, generate a third message which is not encrypted and transmit the third message to the second electronic device.

11. The first electronic device of claim 8,
wherein the at least one processor is further configured to:
add a field including the first security information to at least one field included in the first message, and
record security information in the added field to transmit the security information to the message server.

12. The first electronic device of claim 8, wherein the first security information includes at least one piece of public key information for encrypting the first message and private key information for participating in a chat room.

13. A method performed by a message server, the method comprising:
acquiring, by the message server from a first electronic device, a first message encrypted based on first security information of a second electronic device and transmitting the first message to the second electronic device;
acquiring, by the message server from the second electronic device, a decryption failure signal for the first message and transmitting the decryption failure signal to the first electronic device;
acquiring, by the message server from the second electronic device, second security information of the second electronic device and transmitting the second security information to the first electronic device;
receiving, by the message server from the first electronic device, a second message encrypted based on the second security information; and
transmitting, by the message server to the second electronic device, the received second message.

14. The method of claim 13, further comprising:
detecting, by the message server, access of at least one electronic device to the message server;
acquiring, by the message server from the at least one electronic device, security information related to the at least one electronic device in response to the access; and
storing, by the message server, the acquired security information in memory of the message server.

15. The method of claim 13, further comprising acquiring, by the message server from the second electronic device, the second security information in response to the decryption failure signal for the first message.

16. The method of claim 13, further comprising:
counting a number of generations of the decryption failure signal for the first message by the first electronic device; and
in case that the number of generations exceeds a configured threshold value, displaying a notification related to transmission of the first message by the first electronic device.

17. The method of claim 13, further comprising identifying, by the message server, whether the first message is encrypted based on whether there is a field for recording security information in at least one field included in the first message.

18. The method of claim 13, further comprising:
receiving, by the message server, an invite message for participating in a group chat room from the first electronic device;
identifying, by the message server, a third electronic device participating in the group chat room in response to a request signal; and
transmitting, by the message server to the third electronic device, the invite message.

19. The method of claim 18, wherein the invite message includes a message in which a private key corresponding to the group chat room is encrypted, based on security information of the third electronic device.

20. The method of claim 13, wherein the first security information includes at least one piece of public key information for encrypting the first message and private key information for participating in a chat room.

* * * * *